(12) United States Patent
Leonard

(10) Patent No.: US 10,768,452 B2
(45) Date of Patent: Sep. 8, 2020

(54) METHOD FOR ORDERING AN OPTICAL EQUIPMENT

(71) Applicant: Essilor International, Charenton-le-Pont (FR)

(72) Inventor: Eric Leonard, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 5 days.

(21) Appl. No.: 15/517,315

(22) PCT Filed: Oct. 8, 2015

(86) PCT No.: PCT/EP2015/073318
§ 371 (c)(1),
(2) Date: Apr. 6, 2017

(87) PCT Pub. No.: WO2016/055597
PCT Pub. Date: Apr. 14, 2016

(65) Prior Publication Data
US 2017/0299899 A1    Oct. 19, 2017

(30) Foreign Application Priority Data
Oct. 9, 2014  (EP) .................................. 14306590

(51) Int. Cl.
*A61B 3/00* (2006.01)
*G02C 3/00* (2006.01)
(Continued)

(52) U.S. Cl.
CPC ........... *G02C 13/005* (2013.01); *G02C 7/027* (2013.01); *G02C 7/028* (2013.01); *G02C 13/001* (2013.01)

(58) Field of Classification Search
CPC .......... G02C 7/027; G02C 7/02; G02C 7/028; G02C 13/003; G06K 9/00281; G09G 5/377; G06Q 30/0641
(Continued)

(56) References Cited

U.S. PATENT DOCUMENTS 6,533,418 B1 *  3/2003  Izumitani ............. G02C 13/003
                                                    351/204
6,692,127 B2    2/2004  Abitbol et al.
(Continued)

FOREIGN PATENT DOCUMENTS

EP      1011006       6/2000
WO   2013140086      9/2013

OTHER PUBLICATIONS

ISR/WO for PCT/EP2015/073318 dated Feb. 29, 2016.

*Primary Examiner* — Mahidere S Sahle
(74) *Attorney, Agent, or Firm* — Oblon, McClelland, Maier & Neustadt, L.L.P.

(57) ABSTRACT

A method, implemented by computer means, for ordering an optical equipment comprising at least a spectacle frame suitable for a wearer, the method comprising:
  a wearer data providing step during which wearer data relative to a wearer parameter are provided,
  a optical equipment data providing step during which optical equipment data relative to at least the spectacle frame of an optical equipment selected by the wearer are provided,
  a mounting data determining step during which mounting data representative of the spectacle frame being mounted on the wearer's head are determined by taking into account at least said wearer's data and said optical equipment data,
(Continued)

a display step during which the mounting data are displayed in a visually understandable mode.

13 Claims, 7 Drawing Sheets

(51) Int. Cl.
*G02C 7/00* (2006.01)
*G02C 7/02* (2006.01)
*G02C 13/00* (2006.01)

(58) Field of Classification Search
USPC .......................................... 351/159.01–178
See application file for complete search history.

(56) References Cited

U.S. PATENT DOCUMENTS

| | | | |
|---|---|---|---|
| 6,944,327 B1* | 9/2005 | Soatto | G02C 13/003 |
| | | | 351/159.78 |
| 8,708,494 B1 | 4/2014 | Surkov et al. | |
| 2010/0293192 A1* | 11/2010 | Suy | G02C 13/003 |
| | | | 707/769 |
| 2012/0212705 A1 | 8/2012 | Calixte et al. | |
| 2015/0049304 A1 | 2/2015 | Cussac et al. | |

* cited by examiner

METHOD FOR ORDERING AN OPTICAL EQUIPMENT

BACKGROUND OF THE INVENTION

Field of the Invention

The invention relates to a method, implemented by computer means, for ordering an optical equipment comprising at least a spectacle frame suitable for a wearer and to a method of providing an optical equipment to a wearer. The invention further relates to an optical equipment ordering system for ordering an optical equipment comprising at least a spectacle frame adapted to a wearer and to a computer program product comprising one or more stored sequences of instructions that are accessible to a processor and which, when executed by the processor, causes the processor to carry out the steps of the invention.

Description of the Related Art

U.S. Pat. No. 6,692,127 discloses a spectacles fitting system using digital images of the subject's head and combining them with digital representation of a selected spectacle frame to provide to the subject a visual representation of his/her face with the selected spectacle frame.

Although the spectacles fitting system appears simple and well controlled, the satisfaction rate of optical equipment ordering systems based on such fitting system appears low. In particular, a remaining significant part of the wearers remain unsatisfied by the visual result when they actually try on the optical equipment.

One of the issues of online spectacles fitting system ordering systems is that the wearer may not try-on the selected spectacle frame.

BRIEF SUMMUARY OF THE INVENTION

Thus, there is a need to improve the process of helping the wearer chose his optical equipment and in particular the spectacle frame that fits him or her most.

An aim of the present invention is to propose a method for ordering an optical equipment comprising at least a spectacle frame suitable for a wearer that provides the wearer with an accurate and understandable visual representation of him or her wearing the optical equipment.

To this end, the present invention relates to a method, for example implemented by computer means, for ordering an optical equipment comprising at least a spectacle frame suitable for a wearer. The method comprises:
 a wearer data providing step during which wearer data relative to a wearer parameter are provided,
 a optical equipment data providing step during which optical equipment data relative to at least the spectacle frame of an optical equipment selected by the wearer are provided,
 a mounting data determining step during which mounting data representative of the spectacle frame being mounted on the wearer's head are determined by taking into account at least said wearer's data and said optical equipment data, and
 a display step during which the mounting data are displayed in a visually understandable mode.

Advantageously, in the method according to the invention the mounting data are determined by taking into account at least the wearer's data and the optical equipment data. Thus, increasing the accuracy of the mounting data and in particular the visual representation of such mounting data. Therefore, the wearer has a more accurate representation of the visual effect of the selected spectacle frame when worn.

According to further embodiments which can be considered alone or in combination:
 the wearer data comprise geometrical data representative of the geometry of at least part of the area of the wearer's head supporting the spectacle frame when mounted on the wearer's head; and/or
 the wearer data comprise geometrical data representative of the geometry of the shape of the nose and/or of the ears of the wearer; and/or
 the optical equipment data comprise weight data representative of the weight of the optical equipment selected by the wearer; and/or
 the method further comprises after the display step:
  a wearer's opinion providing step during which the wearer's opinion concerning the mounting data is provided,
  an mounting data modifying step during which the mounting data are modified based on information relating to the wearer's opinion,
  wherein the mounting data determining step, display step, wearer's opinion providing step and mounting data modifying step are repeated up to the wearer's satisfaction so as to obtain final mounting data; and/or
 the mounting data modifying step comprises at least one of:
  selecting a new spectacle frame,
  modifying the selected spectacle frame, and
  modifying the wearer data; and/or
 the method further comprises a deformation data determining step, during which deformation data representative of a deformation of the spectacle frame part of the optical equipment selected by the wearer are determined based on the wearer data and/or the mounting data, and wherein during the mounting data modifying step the mounting data are modified taking into account the deformation data; and/or
 the mounting data are further based on dynamic data representative of the behavior of the optical equipment when mounted on the wearer's head having a dynamic motion.
 the optical equipment comprises optical lenses to be mounted in the spectacle frame and the optical equipment data further comprise optical lens data representative of the optical lenses and during the mounting data determining step the mounting data are determined taking into account the optical lens data; and/or
 the wearer data further comprise wearer prescription data relative to the wearer's prescription, and the method further comprises an optical lens modifying step during which the optical lens data are modified based on the mounting data; and/or
 the optical lens data comprise optical lens design data representative of the dioptric function of the optical lens; and/or The invention further relates to a method of providing an optical equipment to a wearer, comprising:
 an optical equipment ordering step during which an optical equipment is ordered according to any of the preceding claims,
 an optical lens manufacturing step during which the optical lenses are manufactured,
 an optical lens mounted step during which the manufactured optical lenses are mounted to the spectacle frame of the optical equipment, an optical equipment providing step during which the optical equipment is provided to the wearer.

According to an embodiment of the invention, the method of providing an optical equipment to a wearer may comprise further to the optical equipment providing step the method an optical equipment wearer's opinion providing step during which the wearer's opinion concerning the provided optical equipment is provided and an ordering method adapting step during which at least one of the steps of the ordering method is adapted based on the wearer's opinion.

The invention also relates to an optical equipment ordering system for ordering an optical equipment comprising at least a spectacle frame adapted to a wearer, the system comprising:

receiving means adapted to receive wearer data relative to a wearer parameter and optical equipment data relative to at least the spectacle frame of the optical equipment, determining means adapted to determine mounting data representative of the spectacle frame of said optical equipment when mounted on the wearer's head by taking into account said wearer's data and said optical equipment data, communication means adapted to send to a display device data representative of the mounting data.

The invention further relates to an optical equipment ordering system for ordering an optical equipment comprising at least a spectacle frame adapted to a wearer, the system comprising:

receiving means adapted to receive mounting data representative of the spectacle frame of said optical equipment when mounted on the wearer's head, display means adapted to display in a visually understandable mode the mounting data, communication means adapted to receive and to send to a distinct entity wearer's opinion data representative of the wearer's opinion concerning the displayed mounting data.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE SEVERAL VIEWS OF THE DRAWINGS

Other features and advantages of the present invention will become apparent from the following description of non-limitative embodiments, with reference to the attached drawing in which.

DETAILED DESCRIPTION OF THE INVENTION

The present invention relates to a method, for example implemented by computer means, for ordering an optical equipment comprising at least a spectacle frame suitable for a wearer.

Figure 1:
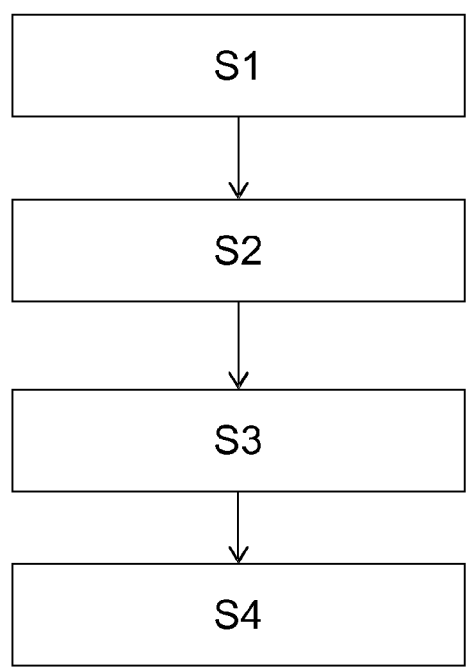
FIG. 1 is a flowchart of different steps of a method according to the invention.

As represented on FIG. 1, the method according to the invention may comprise:

a wearer data providing step S1,
a optical equipment data providing step S2,
a mounting data determining step S3,
a display step S4.

During the wearer data providing step S1, wearer data relative at least to a wearer parameter are provided.

Preferably, the wearer parameters relate to features of the wearer's head, in particular the wearer's face.

According to an embodiment of the invention, the wearer data comprise geometrical data representative of the geometry of at least part of the area of the wearer's head supporting the spectacle frame when mounted on the wearer's head.

Typically, the wearer data comprise geometrical data representative of the geometry of the shape of the nose and/or of the ears of the wearer.

According to an embodiment of the invention, the wearer data relate to measured wearer parameters. In other words, the wearer data relate at least to features of the wearer, for example the geometry of the shape of the nose and/or of the ears of the wearer, that have been measured on the wearer.

According to an embodiment of the invention, at least part of the measurements of the wearer's features are carried out prior to the implementation of the method of the invention.

Typically, at least part of the measurements are carried out at a retail location or using specific measurement devices. The wearer data may be stored in a database of a distant entity such as a server connected to the public Internet. The wearer data is typically associated with a wearer identifier advantageously associated with a PIN code to ensure the wearer's privacy.

During the optical equipment data providing step S2, optical equipment data relative at least to the spectacle frame of an optical equipment selected by the wearer are provided.

Typically, the optical equipment data comprise geometrical data relating to the shape of the spectacle frame, such as a 3D representation of the spectacle frame. The 3D representation may typically be issued from a spectacle frame inventory generated by frame providers. The spectacle frame inventory typically contains a virtual inventory including 3D spectacle frame representations which may comprise 3D content files of a multiplicity of frames which may be imported from frame modelling sources.

The optical equipment data may further comprise weight data representative of the weight of the optical equipment selected by the wearer. Typically, the weight data correspond to the weight of the spectacle frame. The weight data may further comprise information relating to the weight distribution in the spectacle frame. The weight data may also relate to the weight of the optical lenses to be mounted in the spectacle frame.

Advantageously, the weight data may be used to determine the behavior of the spectacle frame when worn by the wearer, in particular in case of dynamic motion.

Typically, the weight distribution of the optical equipment may have a great influence on the behavior of the optical equipment when the wearer's head has dynamic movements.

During the mounting data determining step S3, mounting data representative of the spectacle frame when mounted on the wearer's head are determined. The mounting data are determined by taking into account at least the wearer's data and the optical equipment data.

Typically, the mounting data are determined taking into account a 3D representation of the wearer's head and of the spectacle frame of the selected optical equipment, the geometry of the shape of the wearer's nose, the geometry of the wearer's ears.

The weight data may further be considered when determining the mounting data so as to provide a more accurate representation of the optical equipment when worn by the wearer.

According to an embodiment of the invention, the mounting data are further based on dynamic data representative of the behavior of the optical equipment when mounted on the wearer's head having a dynamic motion.

Typically, the dynamic data may be determined based on pre-recorded dynamic motions. For example the wearer may select form a list of pre-recorded dynamic motions corresponding to different activity the wearer may carry out, such as reading, driving, walking, running, playing golf, swimming etc. . . . . . The wearer may selected in the list the type of activity his or she is the most likely to carry out when using the optical equipment so as to have the mounting data determined based on such activity.

According to a further embodiment, the wearer may adapt the dynamic motion, for example by providing dynamic motions to a representation of his or her face, using a mouse or a touch screen. The mounting data may be determined based on such dynamic motion so as to provide to the wearer a representation of the dynamic behavior of the selected optical equipment.

When the mounting data are further based on dynamic data it is particularly advantageous in terms of accuracy to have the optical equipment data comprise weight data.

During the display step S4, the mounting data are displayed in a visually understandable mode. Typically, the mounting data are displayed by showing a representation of the wearer's face with the selected optical equipment, comprising at least the spectacle frame, superimposed thereupon.

The mounting data may be displayed in a 2D or 3D mode using any type of display, such as a smartphone, a touchpad, a computer or TV screen, a 3D display device, or a head mounted display device.

The mounting data are preferably displayed to the wearer but according to different embodiments of the invention, the mounting data could be displayed to different person. The different person may not be at the same location and may use different display device.

Typically, the wearer and his eye practitioner may display the mounting data at different location and even different time. Typically, the eye practitioner may from his retail location virtually try on the wearer's head different optical equipment and based on specified criteria make a first selection. Such selection of optical equipment and associated mounting data may be displayed by the wearer from his home using a public internet connection.

According to an embodiment, different authorized users, such as the wearer's friend or family may display the mounting data from different location and at different times. The different authorized users can provide advice and/or comments to the wearer to help him choice the most appropriate optical equipment.

Figure 2:
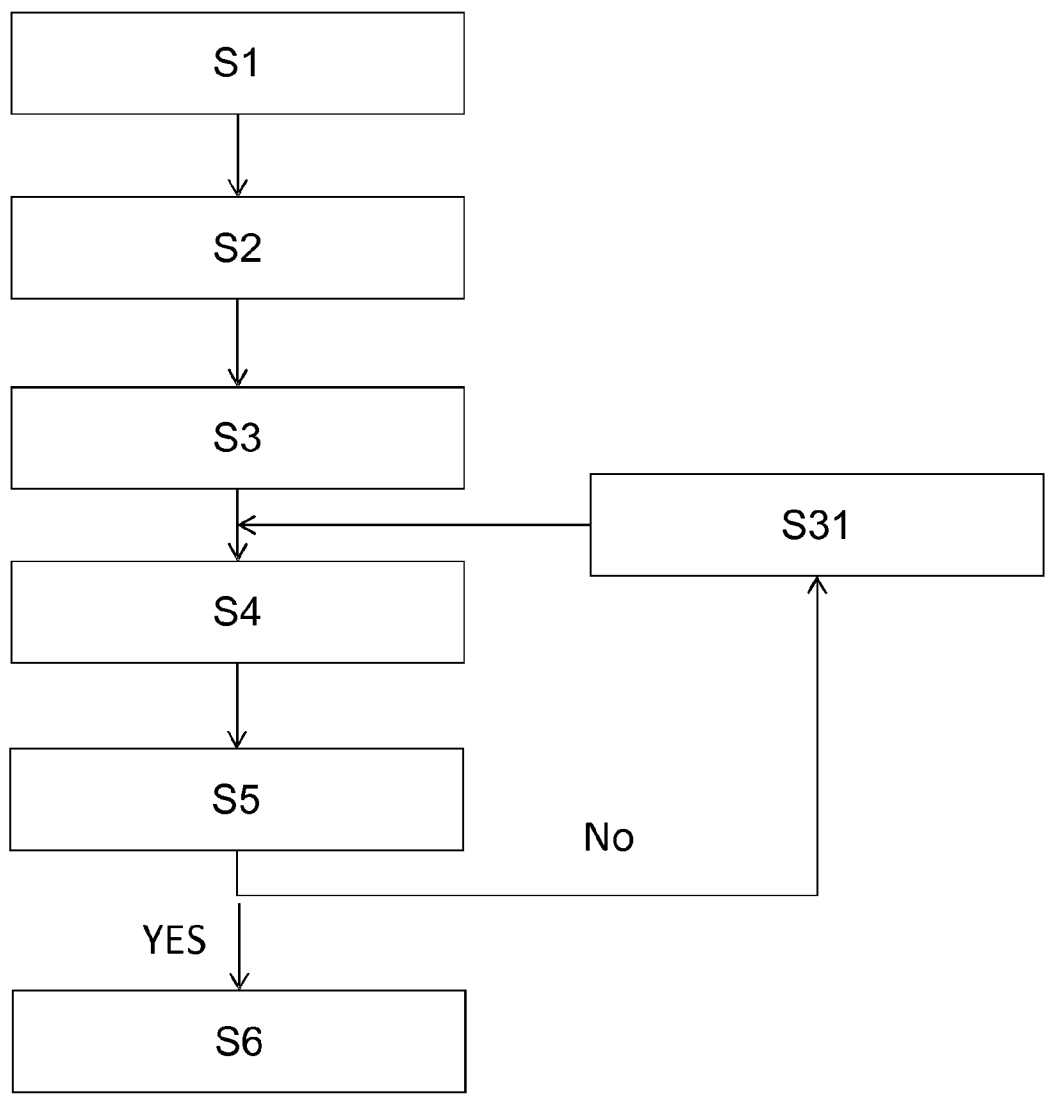
FIGS. 2 to 5 are a flowcharts of different embodiment of the method according to a the invention.
Figure 3:
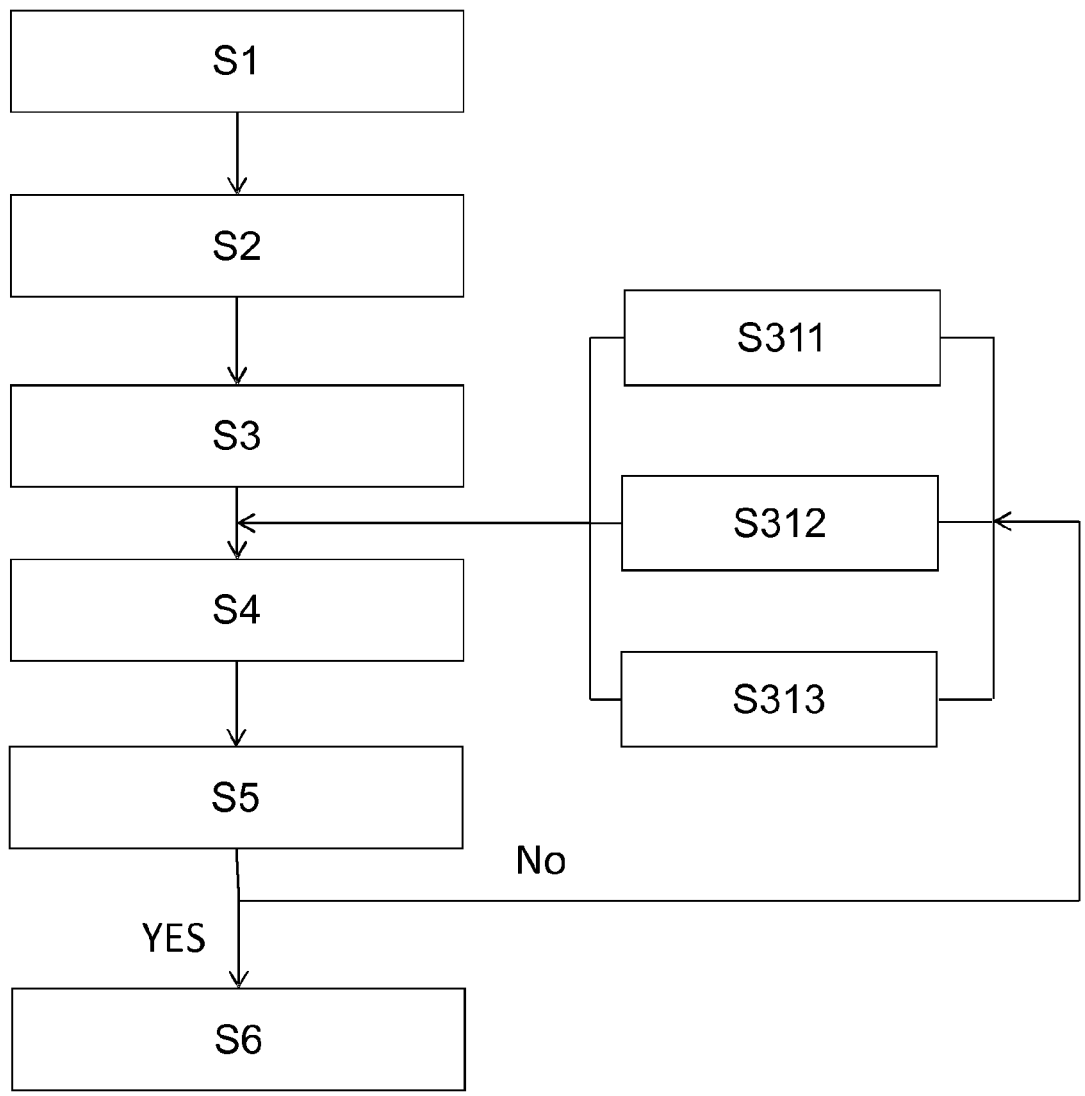
Figure 4:
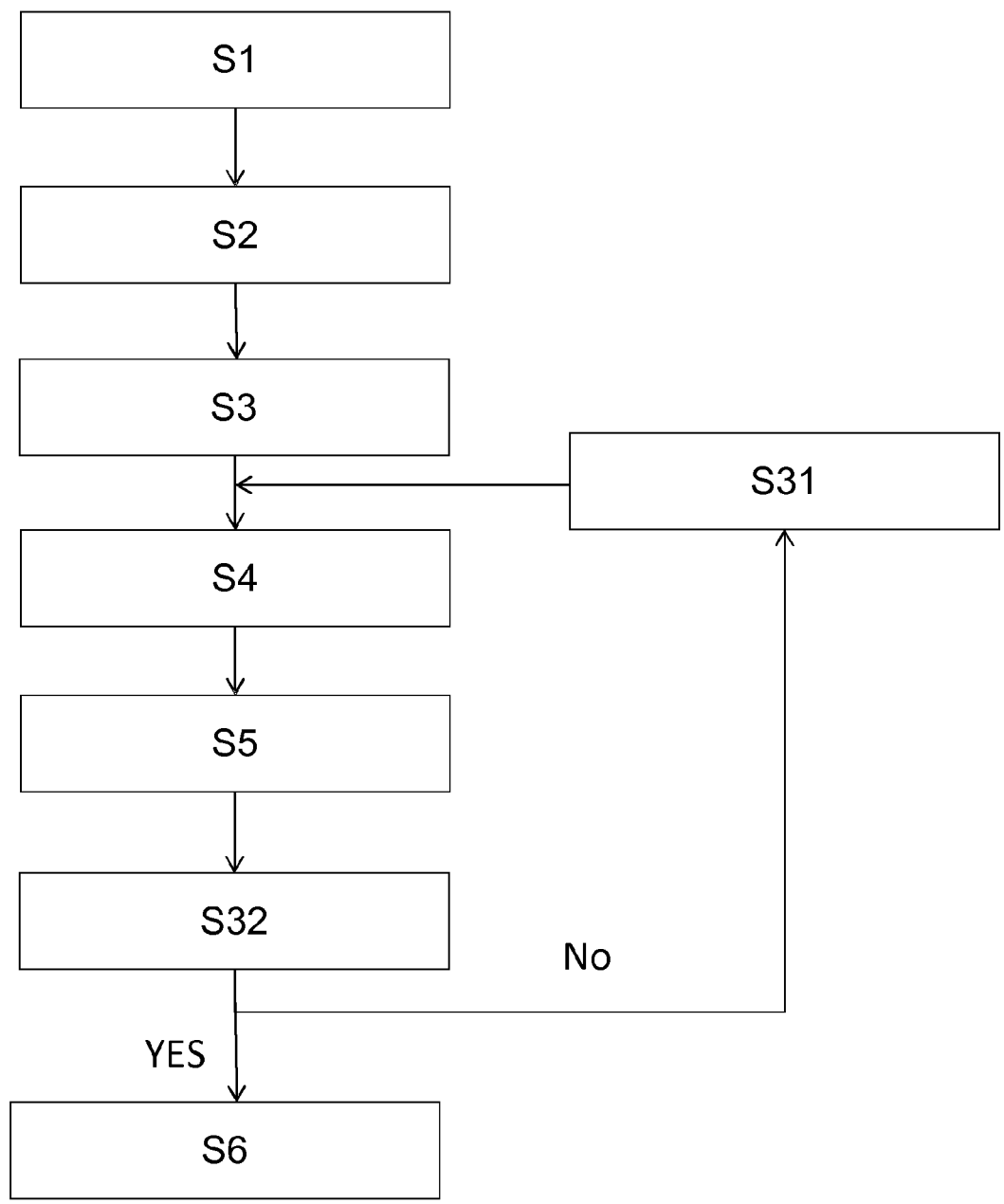

As illustrated on FIGS. 2 to 4, the method according to the invention may further comprise an optical equipment ordering step S6 during which an optical equipment is ordered.

According to an embodiment of the invention represented on FIG. 2, the method according to the invention may further comprise
  a wearer's opinion providing step S5, and
  a mounting data modifying step S31.

During the wearer's opinion providing step the wearer provides an opinion concerning the mounting data as displayed during the display step S4. Although, in a preferred embodiment, the wearer provides his or her opinion during the wearer's opinion providing step, the invention is not limited to having the wearer sole provide his or her opinion. Indeed, further users, authorized by the wearer, may provide an opinion, such as friends or family of the wearer.

During the mounting data modifying step S31, the mounting data determined during the mounting data determining step are modified based on information relating to the wearer's opinion.

The mounting data determining step, display step, wearer's opinion providing step and mounting data modifying step are repeated up to the wearer's satisfaction so as to obtain final mounting data.

Typically, the opinion provided by the wearer may be an acceptance or a non-acceptance of the optical equipment as displayed.

The wearer's opinion may also be a more directive opinion and specifically point a parameter or element of the optical equipment that is to be changed. The wearer's opinion may also comprise an indication of changing the dynamic data.

As represented on FIG. 3, the mounting data modifying step S31 may comprise at least one of:
  selecting a new spectacle frame S311,
  modifying the selected spectacle frame S312, and
  modifying the wearer data S313.

For example, upon display of the mounting data, the wearer may be of the opinion that the selected spectacle frame when mounted on his head provides an undesired visual result and therefore provide an opinion during the wearer's opinion providing step S5 that the spectacle frame should be changed. Upon reception of the wearer's opinion a new spectacle frame is selected in a list of available spectacle frames and the mounting data a modified based on the new selected spectacle frame.

Alternatively, the wearer's opinion may lead to modifying the selected spectacle frame S312, without having to change the spectacle frame. Indeed most spectacle frame have a degree of flexibility and the shape of part of the spectacle frame such as the pad or the shape of the side may be modified. A modification of the spectacle frame as an impact on the mounting data that are modified during the mounting data modifying step S31 based on the modification of the selected spectacle frame.

Typically, the method according to the invention may comprise a deformation data determining step, during which deformation data representative of a deformation of the spectacle frame part of the optical equipment selected by the wearer are determined based on the wearer data and/or the mounting data. During the mounting data modifying step the mounting data are modified taking into account the deformation data.

During the wearer's opinion providing step S5, the wearer may further express the opinion of changing the wearer data. Typically, the wearer may wish to update the geometry of the area of the wearer's head supporting the spectacle frame. Such modification has an impact on the mounting data that may need to be modified. The wearer may also wish to display his head with the selected optical equipment with different haircuts, color, skin tone, etc. . . . . The mounting data may be modified so as to provide during the display step a visually understandable display of the wearer's head with the selected optical equipment.

According to an embodiment of the invention, the optical equipment may comprise optical lenses to be mounted in the spectacle frame.

As represented on FIG. 4, the optical equipment data may further comprise optical lens data representative of the optical lenses and during the mounting data determining step the mounting data are determined taking into account the optical lens data.

Figure 5:
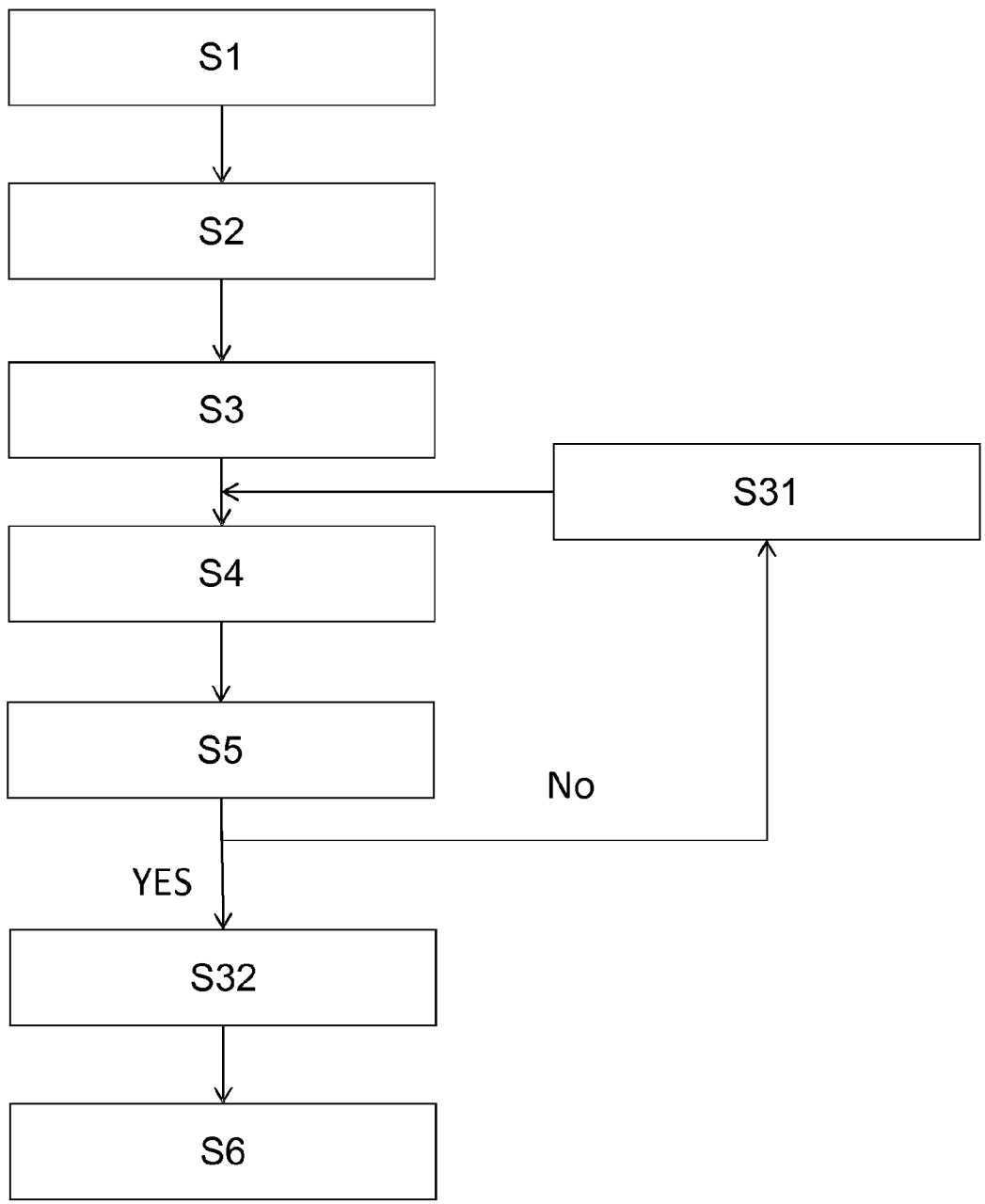

As represented on FIGS. 4 and 5, the wearer may provide an opinion prior or after the optical lens data determining step S32. Advantageously, when the wearer provides his opinion after the optical lens data determining step, the optical lens may be modified upon reception of the wearer's opinion.

Typically, the wearer may consider that the thickness of the optical lens is to great and upon reception of the opinion of the wearer the optical lens data may be modified to propose a thinner and lighter optical lens According to an embodiment, the wearer data further comprise wearer prescription data relative to the wearer's prescription, and the method further comprises an optical lens modifying step during which the optical lens data are modified based on the mounting data.

Typically, the optical lens data comprise optical lens data representative of the optical function, for example the dioptric function, of the optical lens.

In the sense of the invention, the optical function corresponds to a function providing for each gaze direction the effect of the optical lens on the light ray passing through the optical lens.

The optical function may comprise as dioptric function, light absorption, polarizing capability, reinforcement of contrast capacity, etc. . . . . .

The dioptric function corresponds to the optical lens power (mean power, astigmatism etc. . . . ) as a function of the gaze direction.

In the sense of the invention, "lens design designates the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:
  a power profile along the main gaze directions (meridian line) used by the lens wearer during day life activities,
  distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

Progressive lens "lens designs" are tested through rigorous trials before being commercialized.

The invention further relates a method of providing an optical equipment to a wearer, comprising:
  an optical equipment ordering step during which an optical equipment is ordered according to any of the preceding claims,
  an optical lens manufacturing step during which the optical lenses are manufactured,
  an optical lens mounted step during which the manufactured optical lenses are mounted to the spectacle frame of the optical equipment,
  an optical equipment providing step during which the optical equipment is provided to the wearer.

According to an embodiment of the invention, the method of providing an optical equipment to a wearer may further comprise an optical equipment wearer's opinion providing step during which the wearer's opinion concerning the provided optical equipment is provided. Advantageously, the method may further comprise ordering method adapting step during which at least one of the steps of the ordering method is adapted based on the wearer's opinion. Such ordering method adapting step helps improving the overall quality of the method and the satisfaction of the wearers.

Figure 6:
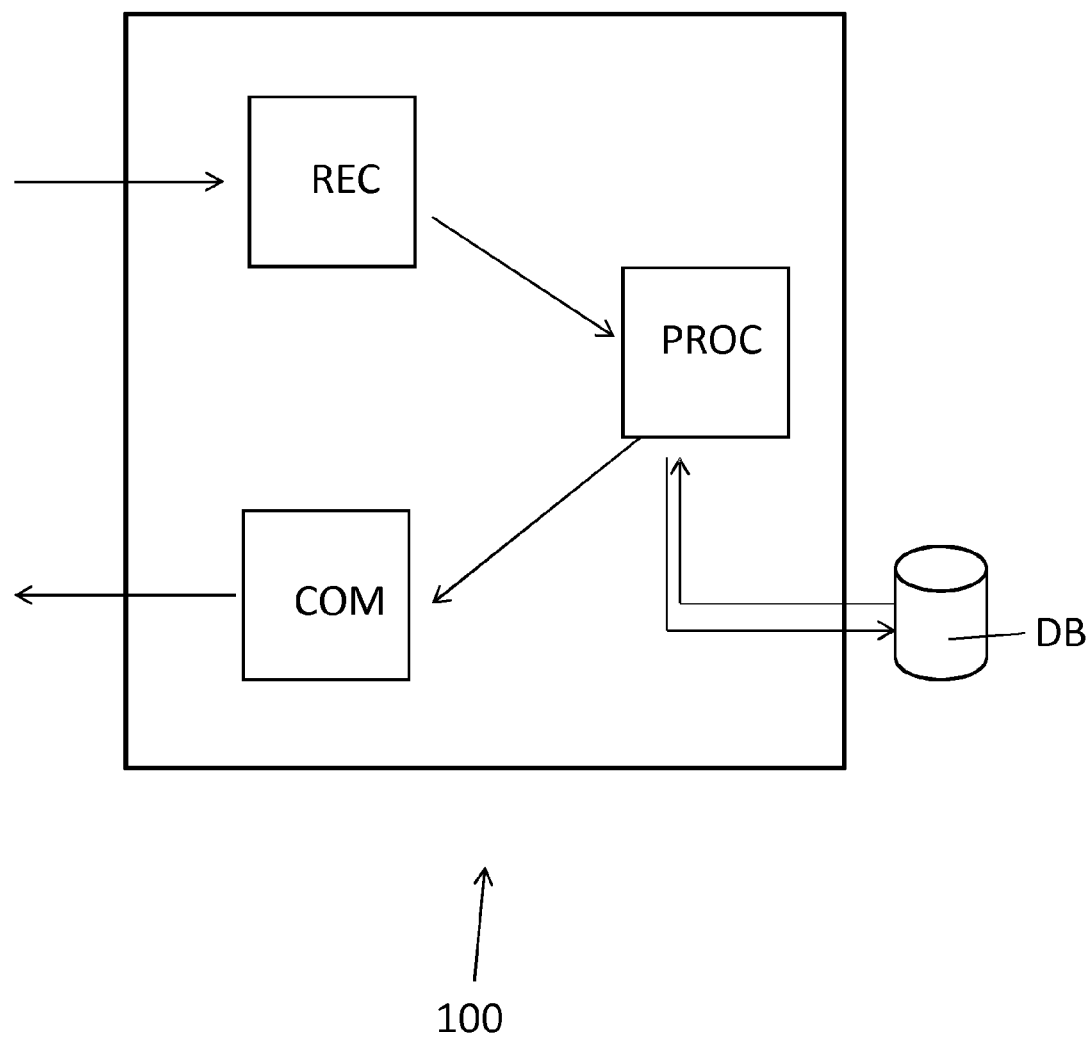
FIG. 6 is a schematic representation of an optical equipment ordering system.

The invention further relates to an optical equipment ordering system 100 for ordering an optical equipment comprising at least a spectacle frame adapted to a wearer. An example of such ordering system is represented on FIG. 6, and comprises:

receiving means REC,
determining means PROC, and
communication means COM,

The receiving means, are configured to receive wearer data relative to a wearer parameter and optical equipment data relative to at least the spectacle frame of the optical equipment. Such wearer data and optical equipment data may be received by different distant entity connected to the ordering system through the public internet.

The determining means PROC, typically comprise a processor configured to execute computer executable components stored in a memory, so as to determine mounting data representative of the spectacle frame of said optical equipment when mounted on the wearer's head by taking into account said wearer's data and said optical equipment data.

The determining means may be linked to a data base DB of mounting data so as to reduce calculation time and power.

Data representative of the mounting data are sent to a display device by the communication means, for example via the public internet or locally at the same location as the ordering system.

The invention also relates to an optical equipment ordering system 200 for ordering an optical equipment comprising at least a spectacle frame adapted to a wearer, the system comprising:

receiving means adapted to receive mounting data representative of the spectacle frame of said optical equipment when mounted on the wearer's head, display means adapted to display in a visually understandable mode the mounting data, communication means adapted to receive and to send to a distinct entity wearer's opinion data representative of the wearer's opinion concerning the displayed mounting data.

Figure 7:
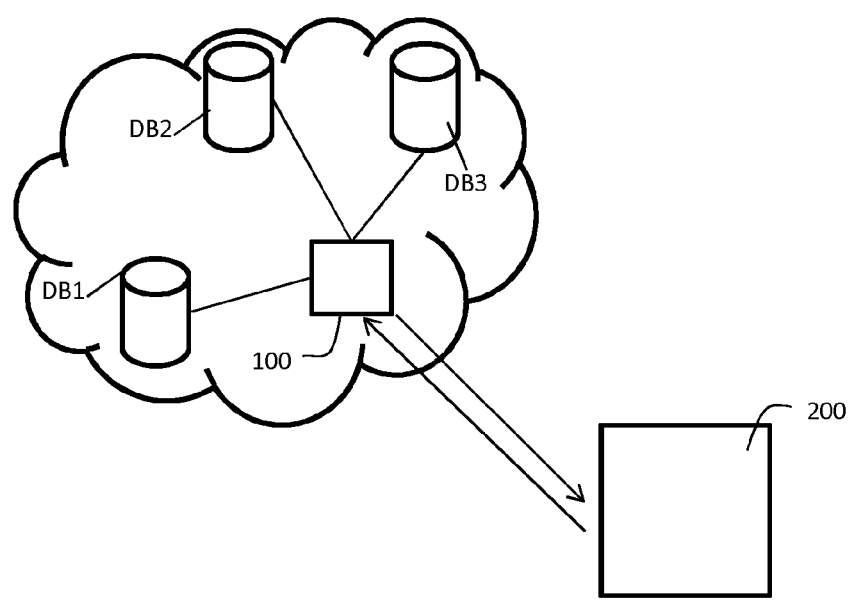
FIG. 7 is a schematic representation of a network or distributed computing environment with which one or more aspects described herein can be associated.

FIG. 7 provides a schematic diagram of an exemplary network or distributed computing environment with which on or both of the ordering system of the invention may be associated.

Typically, the wearer is on the ordering side with an ordering system 200 comprising the display device. The ordering system 200 communicates over the internet with a ordering system 100 that comprises processing means. The ordering system 200 further comprises communication means adapted to communicate with different data bases that may store spectacle frame data DB1, lens design data DB2, or wearer parameter data DB3.

The processing means of the ordering system 100 comprise at least a processor configured to execute computer executable components stored in a memory, so as to determine mounting data.

Data representative of the mounting data are sent to a display device by the communication means, for example via the public internet or locally at the same location as the ordering system.

As represented on FIG. 7, the ordering system 200 comprising the display device may communicate to the processing means, typically to provide the wearer's opinion.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method, implemented by a computer, for ordering an optical equipment including at least a spectacle frame suitable for a wearer, the method comprising:

a wearer data obtaining step during which wearer data relative to a wearer parameter is obtained;

an optical equipment data obtaining step during which optical equipment data relative to at least the spectacle frame of the optical equipment selected by the wearer is obtained, wherein the optical equipment data comprise weight data representative of the weight of the optical equipment selected by the wearer;

a mounting data determining step during which mounting data representative of the spectacle frame being mounted on a head of the wearer is determined by taking into account at least the wearer data and the optical equipment data;

a display step during which the mounting data is displayed in a visually understandable mode;

a wearer's opinion obtaining step during which a wearer's opinion concerning the mounting data is obtained;

a mounting data modifying step during which the mounting data is modified based on information relating to the wearer's opinion; and a deformation data determining step, during which deformation data representative of a physical deformation of a spectacle frame part of the optical equipment selected by the wearer is determined based on the wearer data the mounting data, or both, wherein during the mounting data modifying step the mounting data is modified taking into account the deformation data, wherein the mounting data determining step, the display step, the wearer's opinion obtaining step, and the mounting data modifying step are repeated up to satisfaction of the wearer to obtain final mounting data, and wherein the mounting data is further based on dynamic data representative of a behavior of the optical equipment when mounted on the head of the wearer having a dynamic motion.

2. The method according to claim 1, wherein the wearer data comprises geometrical data representative of a geometry of at least part of an area of the head of the wearer supporting the spectacle frame when mounted on the head of the wearer.

3. The method according to claim 2, wherein the wearer data comprises geometrical data representative of the geometry of the shape of a nose of the wearer of the ears of the wearer or both.

4. The method according to claim 1, wherein the mounting data modifying step comprises at least one of:

selecting a new spectacle frame;

modifying the selected new spectacle frame; and
modifying the wearer data.

5. The method according to claim 1, wherein the optical equipment comprises optical lenses to be mounted in the spectacle frame, and the optical equipment data further comprise optical lens data representative of the optical lenses, and during the mounting data determining step the mounting data is determined taking into account the optical lens data.

6. The method according to claim 5, wherein the wearer data further comprises wearer prescription data relative to the a prescription of the wearer, and the method further comprises an optical lens modifying step during which the optical lens data is modified based on the mounting data.

7. The method according to any of claim 5, wherein the optical lens data comprise optical design data representative of the dioptric function of the optical lens.

8. A method of providing an optical equipment to a wearer, comprising:
an optical equipment ordering step during which the optical equipment is ordered according to claim 1;
an optical lens manufacturing step during which optical lenses are manufactured;
an optical lens mounted mounting step during which the manufactured optical lenses are mounted to a spectacle frame of the optical equipment; and
an optical equipment providing step during which the optical equipment is provided to the wearer.

9. The method according to claim 8, wherein the method comprises:
an optical equipment wearer's opinion providing step during which the an opinion of the wearer concerning the provided optical equipment is provided; and
an ordering method adapting step during which at least one of the steps of the ordering method is adapted based on the opinion of the wearer.

10. A non-transitory computer readable medium comprising one or more stored sequences of instructions that are accessible to a processor and which, when executed by the processor, causes the processor to carry out the steps of claim 1.

11. The method according to claim 1, wherein the weight data comprise information relating to the weight distribution in the spectacle frame.

12. The method according to claim 1, wherein the weight data relate to the weight of a pair of optical lenses to be mounted on the spectacle frame.

13. A computing device for ordering an optical equipment including at least a spectacle frame suitable for a wearer, comprising:
processing circuitry configured to
obtain wearer data relative to a wearer parameter,
obtain optical equipment data relative to at least the spectacle frame of the optical equipment selected by the wearer, wherein the optical equipment data comprise weight data representative of the weight of the optical equipment selected by the wearer,
determine mounting data representative of the spectacle frame being mounted on a head of the wearer by taking into account at least the wearer data and the optical equipment data,
control display of the mounting data in a visually understandable mode,
obtain a wearer's opinion concerning the mounting data,
modify the mounting data based on information relating to the wearer's opinion, and
determine deformation data representative of a physical deformation of a spectacle frame part of the optical equipment selected by the wearer based on the wearer data, the mounting data, or both,
wherein the processing circuitry is further configured to modify the mounting data taking into account the deformation data,
wherein the processing circuitry is further configured to repeat the determination of the mounting data, the display, the obtaining of the wearer's opinion, and the modification of the mounting data up to satisfaction of the wearer to obtain final mounting data, and
wherein the mounting data is further based on dynamic data representative of a behavior of the optical equipment when mounted on the head of the wearer having a dynamic motion.

* * * * *